2,826,558

PERCHLORIC ACID SOLUTION OF ACRYLONITRILE POLYMER AND METHOD OF MAKING SAME

Hans Binder, Rottweil (Neckar), Germany, assignor to Rottweiler Kunstseidefabrik Aktiengesellschaft, Rottweil (Neckar), Germany, a corporation of Germany No Drawing. Application November 2, 1955
Serial No. 544,613

3 Claims. (Cl. 260—29.6)

The present invention relates to polyacrylonitrile solutions; and it, more particularly, relates to such solutions in an inorganic oxygen-containing acid, which solutions are suitable for the production of shaped articles such as fibers, sheets, films, etc.

This is a continuation-in-part of U. S. application Serial Number 277,299, filed March 18, 1952, now abandoned.

It is known that polyacrylonitrile and its copolymers and interpolymers with other polymerizable substances, particularly vinyl or acrylic compounds wherein the polymer contains at least 85% by weight of polymerized acrylonitrile, have very desirable physical and chemical properties. Among these are toughness and insolubility as well as insensitivity to other chemicals, particularly the common organic solvents. Since it is customary to produce shaped articles from solvent solutions of such synthetic resins, the inertness and insolubility of the polyacrylonitrile polymers has created a problem for which, until now, there has been no satisfactory solution.

It has been proposed to dissolve polyacrylonitrile in concentrated sulfuric acid, wherein the concentration is over 70% of $H_2SO_4$. But these solutions are not commercially practical since they are highly viscous and the polyacrylonitrile is rapidly hydrolized by the sulfuric acid. It has also been proposed to use concentrated phosphoric acid solutions, but these solutions are even more impractical than the sulfuric acid.

It has, further, been proposed to dissolve polyacrylonitrile or its mixed polymers by means of a preliminary treatment with concentrated inorganic or organic acids and subsequent addition of small amounts of concentrated sulfuric acid. This process, however, has been found to be unduly lengthy and does not provide results which are as good as those provided by the process of the present invention.

In order to obtain solutions of polyacrylonitrile in inorganic acids, such as are, for example, necessary for the production of threads or films, two factors are highly important: (1) the low degree of viscosity of the solutions and (2) their stability against saponification or hydrolyzation. Generally, low viscosities are desirable in order to prevent excessive pressures in the pipe lines, valve mechanisms, and the like of the processing apparatus.

It has now been found that solutions of polyacrylonitrile in perchloric acid are superior to the presently known solutions in other inorganic acids, both as regards their viscosity and their stability against saponification. This is due to the fact that for each acid there exists a maximum concentration, under which the acid does not completely dissolve the polyacrylonitrile, and the fact that the viscosity of the solution increases with increasing concentration of the acid.

Experiments have shown that, compared with the presently known acids which are capable of dissolving polyacrylonitrile, the maximum concentration, at room temperature, of the perchloric acid is the lowest. This is illustrated by the following table:

| Acid | Concentration at room temperature, percent |
|---|---|
| Perchloric acid | 50 |
| Nitric acid | 55 |
| Sulfuric acid | 70 |
| Phosphoric acid | 93 |

At higher temperatures the maximum concentrations decrease somewhat.

A comparison of the viscosities of polyacrylonitrile having a concentration of 2%, by weight, in each of the acids listed in the above table, as indicated on a viscosity meter, shows the following:

| | Solution in 55.5% $HNO_3$ | Solution in 50% $HClO_4$ | Solution in 70% $H_2SO_4$ | Solution in 95% $H_3PO_4$ |
|---|---|---|---|---|
| Outflow time | 263.8 | 253 | 2490 | 8538 |
| Relative viscosity | 11.45 | 14.9 | 15.6 | 15.2 |

All the above readings on the viscosity meter were taken at 20° C. except that involving the phosphoric acid. In that case, the viscosity had to be measured at 30° C. However, it is evident from this reading that at 20° C., the viscosity would be even higher.

As is clearly seen from the above table, the absolute viscosity, which is of primary importance in commercial practice, is about 10 times as great in the case of sulfuric acid and about 34 times as great in the case of the phosphoric acid, as in the case of the perchloric acid. Furthermore, as the concentrations of the acids are increased above the figures given, the increase in viscosity of the sulfuric acid solutions and of the phosphoric acid solutions are far more rapid than in the case of the other two acids. It is, further, seen that of all the acids listed, the viscosity of the perchloric acid is the lowest.

A further important advantage of the perchloric acid lies in the far slower rate at which the acrylonitrile polymers dissolved therein are hydrolyzed thereby. Consequently, the perchloric acid solutions are far more stable than are any of the others containing the same proportion of acrylonitrile polymers.

The amount of hydrolysis may be determined in various ways. One of these ways consists of measuring the weight increase of the polymer which is precipitated upon the addition of water to the solution. Such weight increase is caused by partial hydrolysis to the amide or by complete hydrolysis to polyacrylic acid. The hydrolysis to the amide shows a weight increase of about 34% while the hydrolysis to the polyacrylic acid shows an increase of about 35.58%.

Another convenient method is to determine the nitrogen content of the precipitated polymer as well as the ammonium salt content of the supernatant solution. Upon complete hydrolysis, the entire nitrogen content of the polyacrylonitrile is converted to a dissolved ammonium salt such as ammonium nitrate, sulfate or perchlorate.

On this analytical basis, the hydrolysis rates of solutions each containing 6% by weight of polyacrylonitrile in the sulfuric and nitric acid solutions, and 12% by weight of the polyacrylonitrile in the perchloric acid solution, were determined at 20° C. A test for the phosphoric acid solutions was not made since these solutions, because of their high viscosity, are obviously not commercially practical. The results of these comparative tests over a period of 120 hours were as follows:

| Storage time | In HNO$_3$, 55.8% Concentr. | In HClO$_4$, 54.9% | In H$_2$SO$_4$, 68.7% |
|---|---|---|---|
| 0 | | | |
| 6 | | 2.5 | 75 |
| 24 | 1.18 | | 83 |
| 48 | 3.24 | 3.2 | |
| 82 | 5.9 | 3.2 | 100 |
| 96 | 9.1 | 5.6 | |
| 120 | 10.0 | | |

The figures in the above table refer to the percentage of dissolved polyacrylonitrile that was hydrolyzed within the storage time indicated. Such storage time was reckoned from the completion of the solution, which, in the case of nitric acid and the perchloric acid, was two hours and, in the case of the sulfuric acid, was 24 hours.

It is clear from the above table that the speed of saponification using sulfuric acid is far greater than when using either the perchloric or the nitric acid. This is clearly indicated by the fact that after only six hours, 75% of the polyacrylonitrile in the sulfuric acid solution was saponified. It should be, further, noted that the polyacrylonitrile in the sulfuric acid solution was completely saponified after 82 hours, whereas, in the same length of time, the saponification in the perchloric acid solution was 3.2% and in the nitric acid solution it was 5.9%.

It should also be noted that, as the length of storage time increased, the perchloric acid solution proved far superior to the nitric acid solution. This is shown by the above table where, after 96 hours, 9.1% of the polyacrylonitrile in the nitric acid solution was saponified, whereas only 5.6% of the polyacrylonitrile in the perchloric acid solution was saponified.

The above data clearly indicates that the perchloric acid is far superior to any of the other acids including even the nitric acid, insofar as concerns the lower maximum concentrations, the lower viscosity of the solutions and the lower speed of saponification. It should be further noted that the perchloric acid is also far less volatile than the nitric acid.

It is quite easy to produce perchloric acid solutions of acrylonitrile polymers wherein the concentration of the polymer is about 14%, by weight, which are completely clear and homogeneous. Such solutions can also be heated to relatively high temperatures without suffering decomposition, etc. This is important since generally an increase of temperature will lower the viscosity.

The acrylonitrile polymer solutions in the perchloric acid are very suitable for wet spinning of threads, fibers, ribbons, and the like, as well as for the manufacture of foils, films, sheets, etc.

The invention is illustrated by the following examples which, however, are not intended to limit the invention in any manner:

Example 1

13 kg. of powdered polyacrylonitrile, having a K-value of 86 are stirred in an acid proof mixer with 87 kg. of a 55% perchloric acid solution; the temperature being maintained at 20° C. If the stirring is vigorous, dissolution is completed within a half hour. The resultant solution is completely clear.

Example 2

6 kg. of a polymer, containing 94.3% of acrylonitrile and 5.7% of vinylchloride and having a K-value of 93.0 are dissolved while stirring in 94 kg. of 55% perchloric acid. During the dissolving a cooling with water is applied for maintaining the temperature at +20° C. The result is a clear colourless solution, which is suitable for the production of good films and fibres.

Example 3

9.2 kg. of polymer, containing 92% of acrylonitrile and 8% of methacrylonitrile and having a K-value of 72.5 are dissolved in 90.8 kg. of a 55% perchloric acid, by maintaining the same conditions as in Example 2. The clear solution is slightly yellowish.

Example 4

9 kg. of a polymer, containing 91% of acrylonitrile and 9% of vinylacetate and having a K-value of 100, are dissolved in 91 kg. of a 55.5% perchloric acid, by maintaining the same conditions of stirring and cooling as in the Examples 1 to 3. The solution is completely clear and slightly yellowish.

Example 5

13 kg. of a polymer, containing 95% of acrylonitrile and 5% of methylacrylate and having a K-value of 90, are dissolved in 87 kg. of a 55% perchloric acid, by maintaining the same conditions of stirring and cooling as in the Examples 1 to 4. The resulting viscous solution is completely clear and slightly yellowish and gives good films and fibres.

The above acids are aqueous acids and their concentrations are expressed in percentage by weight. Also the percentage of the components in the copolymers are percentages by weight.

What is claimed is:

1. The process of forming a polymerized acrylonitrile solution which comprises vigorously stirring, at a temperature of about 20° C., an aqueous perchloric acid solution, having a concentration of about 50% by weight of HClO$_4$, together with a pulverulent acrylonitrile polymer selected from the group consisting of polyacrylonitrile, the co-polymer of acrylonitrile with vinyl chloride, the co-polymer of acrylonitrile with methacrylonitrile, the co-polymer of acrylonitrile with vinyl acetate and the co-polymer of acrylonitrile with methyl acrylate, said copolymers containing at least 85% by weight of monomeric acrylonitrile.

2. A solution suitable for producing shaped articles consisting essentially of an acrylonitrile polymer in aqueous perchloric acid, said polymer being selected from the group consisting of polyacrylonitrile, the co-polymer of acrylonitrile with vinyl chloride, the co-polymer of acrylonitrile with methacrylonitrile, the co-polymer of acrylonitrile with vinyl acetate and the co-polymer of acrylonitrile with methyl acrylate, said co-polymer containing at least 85% by weight of monomeric acrylonitrile, and said aqueous perchloric acid having a concentration of about 50% by weight HClO$_4$.

3. The solution of claim 2 wherein said solution contains at least about 2% by weight of the polymer and a maximum of about 5.6% by weight of the polymer in hydrolyzed form.

References Cited in the file of this patent

UNITED STATES PATENTS 2,579,451   Polson _____ Dec. 18, 1951